United States Patent [19]

Ikematsu et al.

[11] Patent Number: 4,641,681
[45] Date of Patent: Feb. 10, 1987

[54] CLAMP FOR USE WITH TOP ENTRY BALL VALVE

[75] Inventors: Morio Ikematsu, Takaishi; Hiromichi Hiranuma, Sakai, both of Japan

[73] Assignee: Nippon Ball Valve Co., Ltd., Osaka, Japan

[21] Appl. No.: 858,796

[22] Filed: May 2, 1986

[30] Foreign Application Priority Data

May 16, 1985 [JP] Japan .............................. 60-74099[U]

[51] Int. Cl.$^4$ ...................... F16K 43/00; F16K 51/00
[52] U.S. Cl. ................................ 137/315; 29/213 R; 137/454.2; 137/454.6; 251/174
[58] Field of Search ................. 29/213 R, 213 E, 214; 137/315, 454.2, 454.5, 454.6; 251/315, 316, 174

[56] References Cited

U.S. PATENT DOCUMENTS

| | | | |
|---|---|---|---|
| 587,092 | 7/1897 | French | 29/213 R |
| 1,331,305 | 2/1920 | Wilkinson, Jr. | 29/214 |
| 1,437,983 | 12/1922 | Magna | 29/214 |
| 1,781,698 | 11/1930 | O'Brien | 29/213 R |
| 3,170,226 | 2/1965 | Larry | 29/213 R |
| 3,171,429 | 3/1965 | Stürmer et al. | 137/315 |
| 3,305,919 | 2/1967 | Pierce | 29/213 R |
| 3,771,545 | 11/1973 | Allen | 137/315 |
| 4,390,039 | 6/1983 | Johnson et al. | 137/315 |

FOREIGN PATENT DOCUMENTS 1215159 12/1970 United Kingdom ............... 137/315

Primary Examiner—George L. Walton
Attorney, Agent, or Firm—Wenderoth, Lind & Ponack

[57] ABSTRACT

A clamp for use with a top entry type ball valve having a valve casing, a valve body, a seat ring, and a seat ring assembly consisting of another seat ring, a belleville spring and a seat ring holder. The clamp has a pair of clamping plates, a clamping bolt, and a pair of fulcrum bolts. These bolts are screwed through the clamping plates. The lower ends of the clamping plates engage the top of the seat ring and the seat ring holder, respectively. The clamping plates are moved away from each other at the clamping bolt and the distance between them is kept constant at the fulcrum bolts. Thus, the clamping force is applied to the lower ends of the clamping plates.

4 Claims, 9 Drawing Figures

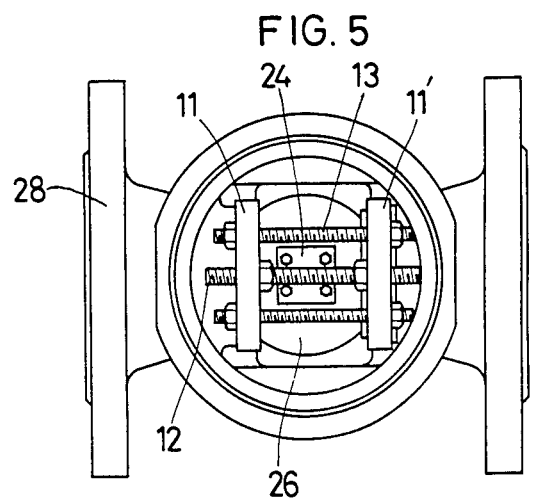
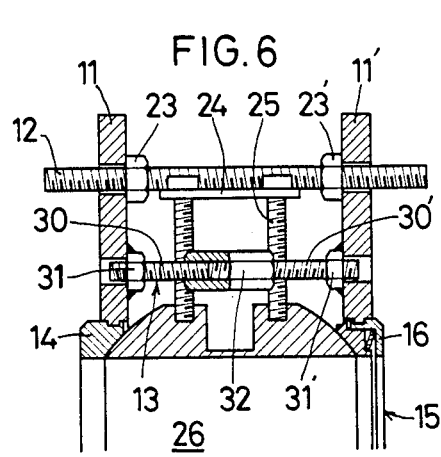
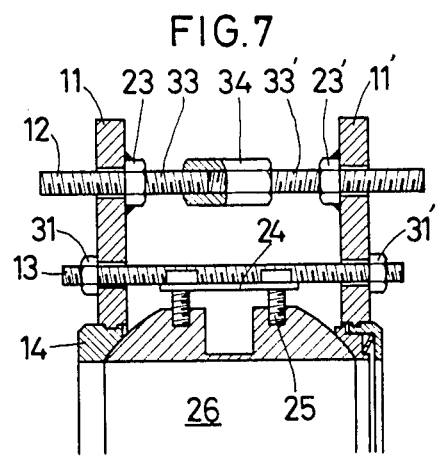
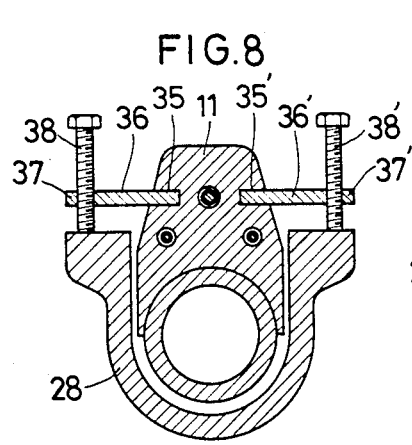
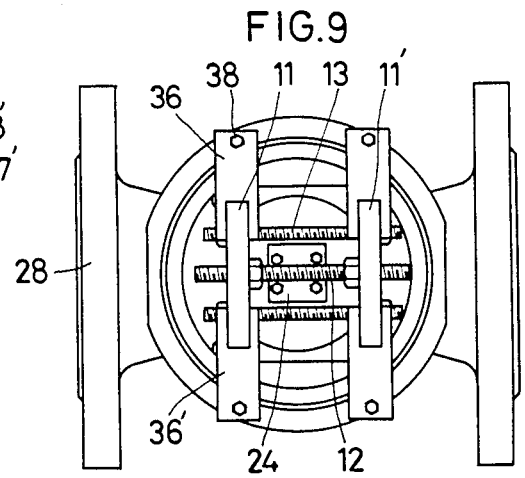

CLAMP FOR USE WITH TOP ENTRY BALL VALVE

BACKGROUND OF THE INVENTION

The present invention relates to clamps for use with a top entry ball valve, and particularly to clamps used when assembling and dismantling the ball valve.

FIG. 1 shows a top entry ball valve disclosed in U.S. patent application Ser. No. 747,959 filed on June 24, 1985. It has a valve casing, a valve body 2, a seat ring 3 disposed between the valve body and a seat receiving surface 1 at the low-pressure side, and a seat ring assembly 8 disposed between the valve body 2 and a seat receiving surface 4 at the high-pressure side. The seat ring assembly 8 consists of a seat ring 5, a belleville spring 6 and a seat ring holder 7.

In order to assemble and dismantle the above said ball valve, the seat ring 3, valve body 2 and seat ring assembly 8 are brought together and mounted and removed into and out of a valve chest 9 with a bonnet 10 removed. When the belleville spring is in its uncompressed state, the seat ring assembly is too thick to be mounted into the valve chest with the seat ring and the valve body. Also, when the valve body 2, seat ring 3, and seat ring assembly 8 are already in the valve chest 9, they cannot be easily taken out of the valve chest because of the resilience of the belleville spring 6.

SUMMARY OF THE INVENTION

An object of the present invention is to provide a clamp which can be used to mount the seat ring, valve body and seat ring assembly together into a valve chest of the ball valve and to remove them together out of it.

Other objects and advantages of the present invention will become apparent from the following description taken with reference to the accompanying drawings, in which:

BRIEF DESCRIPTION OF THE DRAWINGS

FIG. 5 is a plan view showing the same in use;
FIG. 6 is a sectional view of the second embodiment in use;
FIG. 7 is a sectional view of the third embodiment in use;
FIG. 8 is a sectional view of the fourth embodiment;
and
FIG. 9 is a plan view of the same.

DETAILED DESCRIPTION OF THE PREFERRED EMBODIMENT

Figure 2:
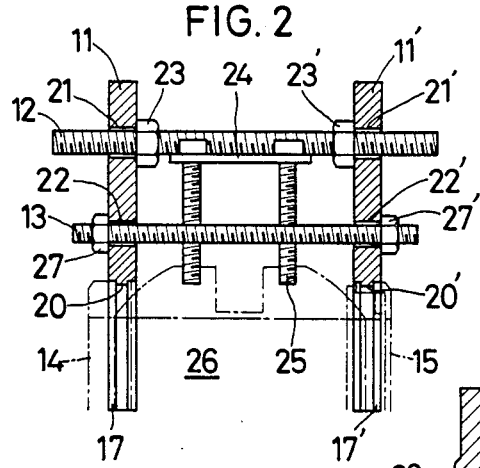
FIG. 2 is a sectional view of the first embodiment.
Figure 3:
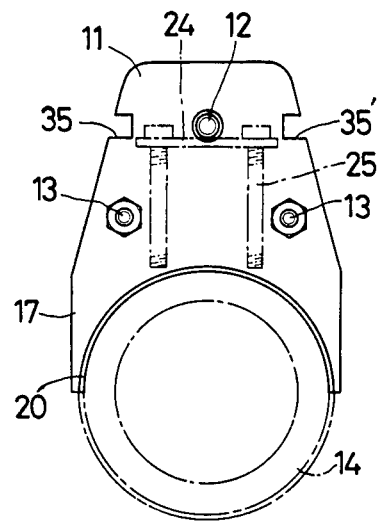
FIG. 3 is a side view of the same.

Referring now to FIGS. 2 and 3, the first embodiment of the clamp includes a pair of clamping plates 11 and 11' facing each other, a clamping bolt 12, and a pair of fulcrum bolts 13 extending parallel with each other.

The clamping plate 11 is to be mounted on the valve seat ring 14 disposed at the low-pressure side, while the clamping plate 11' is to be mounted on the valve seat ring assembly 15 disposed at the high-pressure side. The lower ends of the clamping plates 11 and 11' terminate in fitting portions 17 and 17' having semicircular concaves which are complementary to the peripheral surfaces of the valve seat ring 14 and the valve seat ring holder 16 (FIG. 4), respectively. Tongues 20 and 20' provided on the semicircular concaves of the fitting portions 17 and 17' are adapted to fit in the annular grooves 18 and 19 (FIG. 4) provided in the peripheral surfaces of the valve seat ring 14 and the valve seat ring holder 16, respectively.

The clamping bolt 12 extends through holes 21 and 21' provided in the upper central portion of the clamping plates 11 and 11'. Holes 22 and 22' for allowing the fulcrum bolts 13 to extend therethrough are disposed below the holes 21 and 21' and symmetrically about the vertical center line.

The clamping bolt 12 is passed through the clamping plates 11 and 11' with two lock nuts 23 and 23' on the clamping bolt 12 about the middle portion thereof. A bracket 24 is secured to the middle portion of the clamping bolt 12. Four coupling bolts 25 extend through the bracket 24 and are tightened to the ball valve 26. Two of the coupling bolts 25 are disposed across the clamping bolt 12 from the remaining two. (FIG. 5) Thus the first embodiment of the present invention can be positioned in the right place by connecting it to the ball valve body 26 by means of the bracket 24 and the coupling bolts 25. The clamping bolt 12 is prevented from revolution even when the lock nuts 23 and 23' are turned. The bracket 24 is used when raising the ball valve body 26 by use of a hook.

For a clamp for a comparatively small-sized ball valve the bracket 24 and the coupling bolts 25 may be omitted. In this case, the clamp should be provided with some suitable means for preventing the clamping bolt 12 from turning when the lock nuts 23 and 23' are turned. For example, key seats for receiving keys may be formed in the holes 21 and 21'.

Nuts 27 and 27' are screwed on both ends of the fulcrum bolts 13 projecting outwardly from the clamping plates 11 and 11'. These nuts serve to hold two clamping plates at a given distance from each other.

Figure 1:
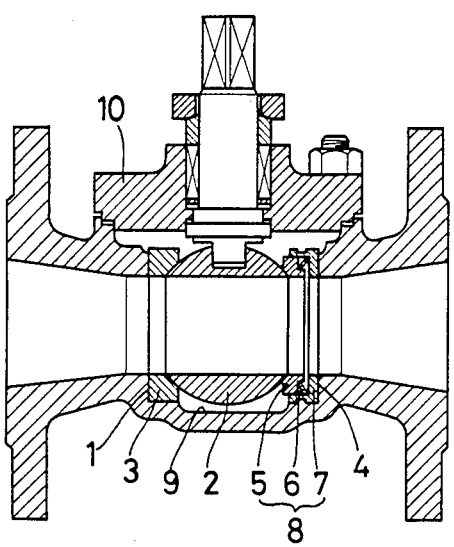
FIG. 1 is a sectional view of a ball valve with which the clamp according to the present invention is used.
Figure 4:
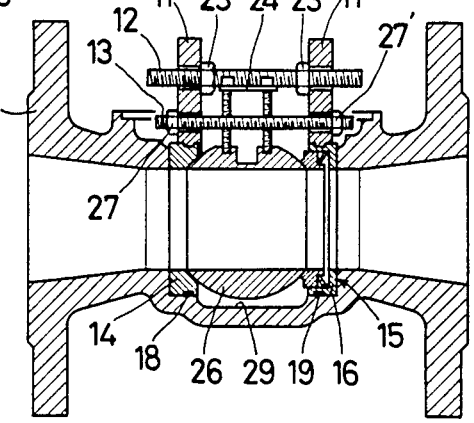
FIG. 4 is a sectional view showing the same in use.

In order to take off the ball valve 26, the valve seat ring 14 and the valve seat ring assembly 15 from the valve casing 28, a bonnet 10 (FIG. 1) is removed from the valve body 28, and the parts of the clamp are assembled into a complete unit as shown in FIGS. 4 and 5. Then the lock nuts 23 and 23' are turned so as to move away from each other. The clamping plates 11 and 11' are pushed so that the upper portions thereof move away from each other. Since the pressure thus applied by the lock nuts 23 and 23' to the clamping plates 11 and 11' are sustained by the nuts 27 and 27', the clamping plates 11 and 11' function as levers with the nuts 27 and 27' serving as fulcrums. Consequently, the clamping plates 11 and 11' undergo forces in such directions as to bring the fitting portions 17 and 17' close to each other. Thus the ball valve 26 is clamped by the valve seat ring 14 and the valve seat ring assembly 15 which are thus given a clamping force.

When the bracket 24 is gripped by hooks and raised, the ball valve 26, the valve seat ring 14 and the valve seat ring assembly 15 slip out of the valve chest 29.

In order to put the ball valve 26, the valve seat ring 14 and the valve seat ring assembly 15 into the valve chest 29, these three components are assembled into one beforehand by means of the above-described first embodiment of the clamp and the assembly is inserted into the valve chest 29. Then the ball valve 26 is released from the clamping force which has been applied thereto by the clamp, and the clamp is detached.

Referring to FIG. 6 showing the second embodiment, the fulcrum bolt 13 comprises two bolts 30, 30' threaded in opposite directions and a turnbuckle 32 disposed between the bolts 30, 30'. Nuts 31, 31' are located on the inside of the clamping plates 11, 11'. The turnbuckle 32 is operated to keep constant the space between the clamping plates 11, 11'. This counteracts the force applied by the clamping nuts 23, 23'.

Referring to FIG. 7 showing the third embodiment, a similar arrangement is adopted for the clamping bolt 12, not for the fulcrum bolts 13. The clamping bolt 12 comprises two bolts 33, 33' threaded in opposite directions and a turnbuckle 34. The turnbuckle is operated to apply a clamping force. In this embodiment, the bracket 24 is secured to the fulcrum bolts 13, not to the clamping bolt 12.

The fourth embodiment shown in FIGS. 8 and 9 is applicable to any one of the first to third embodiments. If it is difficult to remove the components of the ball valve even with the abovementioned clamp (e.g. due to the material being conveyed caught between the parts), one ends of auxiliary plates 36, 36' are fitted in notches 35, 35' formed in each clamping plate 11 (11'). Pulling bolts 38, 38' are screwed into threaded holes 37, 37' formed in the auxiliary plates 36, 36' at the other end thereof so as to extend vertically. The bolts 38, 38' are turned with their lower ends on the top of the ball valve casing 28. This applies an upward force to the auxiliary plates 37, 37', which pull up the entire clamp and thus the ball valve 26, seat ring 14, and seat ring assembly 15.

What we claim:

1. A clamp for use with a top entry ball valve comprising a valve casing, a valve body mounted in the valve casing, said valve casing having an opposed pair of seat receiving surfaces formed therein, a seat ring disposed between said valve body and one of said receiving surfaces at the low-pressure side, a seat ring assembly comprising another seat ring, a belleville spring and a seat ring holder and disposed between said valve body and the other of said seat receiving surfaces at the high-pressure side, said clamp comprising:

an opposed pair of clamping plates;
   a clamping bolt screwed through said clamping plates;
   a fulcrum bolt screwed through said clamping plates and disposed below said clamping bolt;
   said clamping plates being formed at lower end thereof with a concave portion of a shape complementary to the shape of the top of said first named seat ring and said seat ring holder, respectively, and being formed in said concave portion with an engagement portion for engagement with and holding said first named seat ring and said seat ring holder for removal and insertion of said first named seat ring, said seat ring assembly and said valve body from and into said valve casing as a single unit;
   a pair of clamping members threadedly mounted on said clamping bolt for pressing said clamping plates away from each other; and
   means provided for said fulcrum bolt for keeping constant the distance between said clamping plates against the force applied by said clamping members during the assembly as a single unit into and out of said valve casing.

2. The clamp as claimed in claim 1, wherein said fulcrum bolt comprises a turnbuckle and two bolts threaded in opposite directions and screwed into said turnbuckle.

3. The clamp as claimed in claim 1, wherein said clamping bolt comprises a turnbuckle and two bolts threaded in opposite directions and screwed into said turnbuckle.

4. The clamp as claimed in claim 1, further comprising a bracket secured to said clamping bolt and a plurality of coupling bolts screwed through said bracket into said ball valve for coupling the clamp to said ball valve.

* * * * *